Patented May 14, 1940

2,200,957

UNITED STATES PATENT OFFICE

2,200,957

ANTHRACHRYSONE - 2,6 - DIALDEHYDE AND A PROCESS OF PREPARING THE SAME

Georg Kränzlein and Fritz Roemer, Frankfort-on-the-Main, Germany, assignors to General Aniline & Film Corporation, a corporation of Delaware No Drawing. Application October 14, 1939, Serial No. 299,576. In Germany May 17, 1938

2 Claims. (Cl. 260—376)

The present invention relates to anthrachrysone-2,6-dialdehyde and to a process of preparing the same; more particularly it relates to a compound of the following formula:

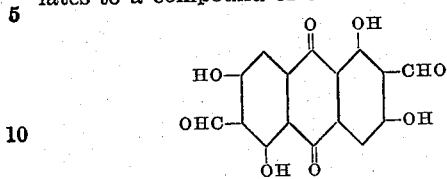

We have found that the two methylol groups of 1,3,5,7-tetrahydroxy-2,6-diamethylolanthraquinone, which may be obtained as described in German Patent No. 184,768, can easily be transformed by the action of nitric acid into aldehyde groups so as to form the anthrachrysone-2,6-dialdehyde. This result is surprising since anthrachrysone yields tetranitroanthrachrysone, when treated in the same manner with nitric acid ($d=1.4$).

The following example serves to illustrate the invention, but it is not intended to limit it thereto; the parts are by weight:

500 parts of finely pulverized 1,3,5,7-tetrahydroxy-2,6-dimethylolanthraquinone are introduced, while stirring, into 3000 parts of nitric acid ($d$=about 1.4), and the mixture is slowly heated. At a temperature of 50° C.–60° C. evolution of nitrous gases occurs. The temperature is gradually raised to 90° C. and kept here until nitrous gases no longer escape. The reaction mass is then introduced into 30,000 parts of water, filtered with suction and washed until neutral. The paste obtained is purified by well stirring it into 10,000 parts of water, then adding about 1000 parts of sodium carbonate and heating the whole to about 80° C. After a short time the 1,3,5,7-tetrahydroxy-2,6-anthraquinonedialdehyde is transformed into a difficulty soluble sodium salt which is filtered with suction at 50° C. and washed with water. By acidifying the product obtained by means of hydrochloric acid the free aldehyde is obtained in the form of a yellow powder. By recrystallization from two hundred times its weight of nitrobenzene the dialdehyde is obtained in the form of finely crystallized yellow-brown leaflets melting above 360° C. The product dissolves in concentrated sulfuric acid to a red-brown solution.

By boiling the dialdehyde for a short time in nitrobenzene with an excess of phenylhydrazine a dihydrazone is obtained which dissolves very difficultly.

By boiling the dialdehyde with acetic anhydride with addition of a small amount of sulfuric acid monohydrate an acetyl compound is obtained which crystallizes from glacial acetic acid in the form of beautiful yellow needles melting at 223° C. According to analysis the product contains eight acetyl groups and has, therefore, the constitution of a 1,3,5,7-tetraacetoxy-2,6-anthraquinone-tetraacetal.

By nitrating the dialdehyde in concentrated sulfuric acid by means of concentrated nitric acid or potassium nitrate a dinitro-compound is obtained. When reduced, for instance, with $N_aSH$, it yields the 1,3,5,7-tetrahydroxy-4,8-diamino-2,6-anthraquinone-dialdehyde, which dyes chrome-mordanted wool Bordeaux-brown shades.

With other aldehyde reagents, such as quinaldine, ortho-phenylenediamine or ortho-aminophenol, the anthrachrysone-2,6-dialdehyde likewise shows the typical aldehyde character.

We claim:

1. Process of preparing anthrachrysone-2,6-dialdehyde which comprises heating 1,3,5,7-tetrahydroxy-2,6-diamethylolanthraquinone with nitric acid.

2. The anthrachrysone-2,6-dialdehyde of the following formula:

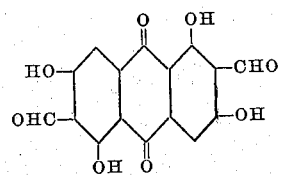

being a yellow powder and forming, when recrystallized from nitrobenzene, yellow-brown leaflets which melt above 360° C.

GEORG KRÄNZLEIN.
FRITZ ROEMER.